M. LISSBERGER.
MACHINE FOR THE MANUFACTURE OF BALLS.
APPLICATION FILED AUG. 4, 1915.

1,183,089.

Patented May 16, 1916.
2 SHEETS—SHEET 1.

Witnesses:
Louise Keller
Minnie C. Reuter

Marks Lissberger, Inventor
By Henry Schreiter, his Attorney

M. LISSBERGER.
MACHINE FOR THE MANUFACTURE OF BALLS.
APPLICATION FILED AUG. 4, 1915.

1,183,089.                          Patented May 16, 1916.
                                         2 SHEETS—SHEET 2.

Witnesses:                    Marks Lissberger, Inventor
Louise Keller
Minnie C. Reuter              By Henry Schreiter his Attorney

UNITED STATES PATENT OFFICE.

MARKS LISSBERGER, OF NEW YORK, N. Y.

MACHINE FOR THE MANUFACTURE OF BALLS.

1,183,089.  Specification of Letters Patent.  Patented May 16, 1916.

Application filed August 4, 1915. Serial No. 43,666.

*To all whom it may concern:*

Be it known that I, MARKS LISSBERGER, a citizen of the United States, and resident of the city, county, and State of New York, have invented a certain new and useful Improvement in Machines for the Manufacture of Balls, of which improvement the following is a full, clear, and exact specification, reference being had to the accompanying drawing, wherein—

Figure 1:
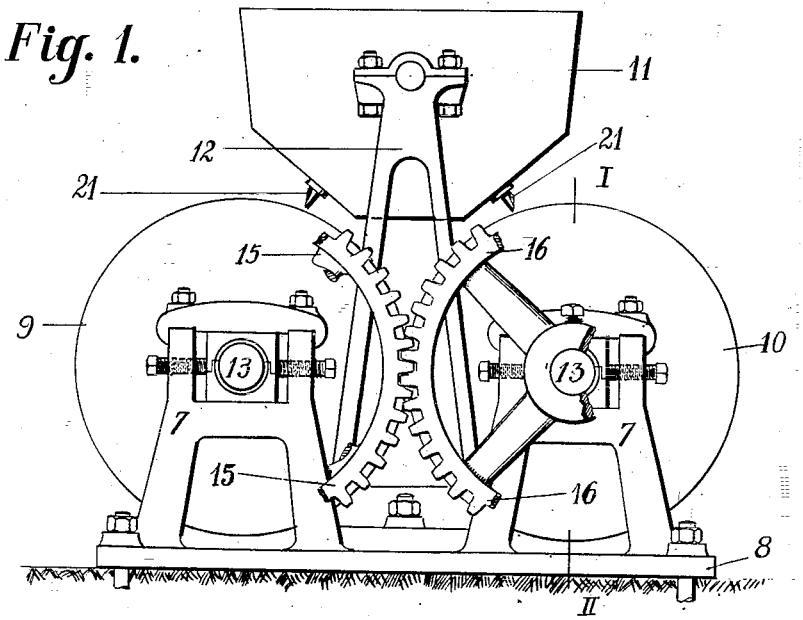
Figure 2:
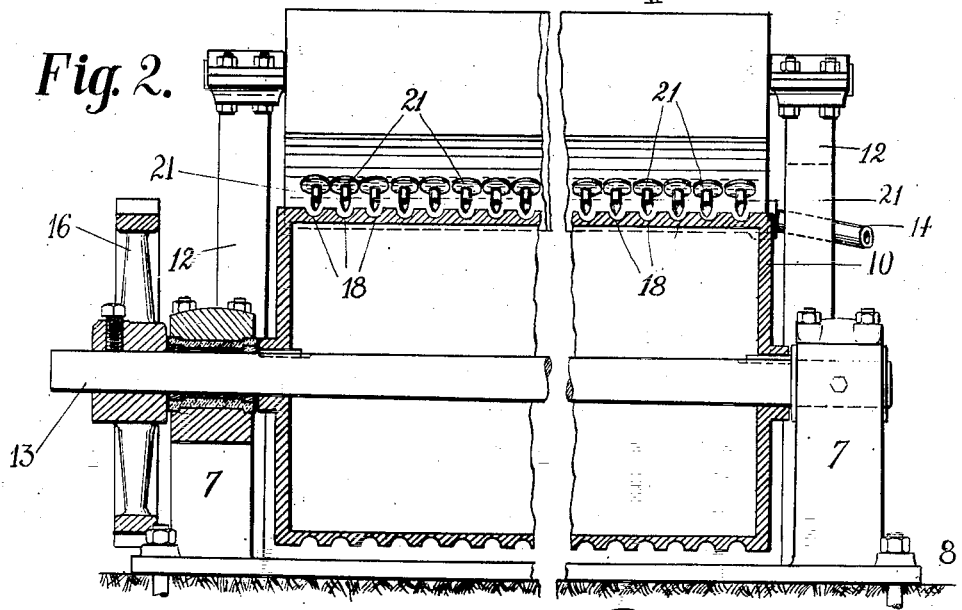
Figure 3:
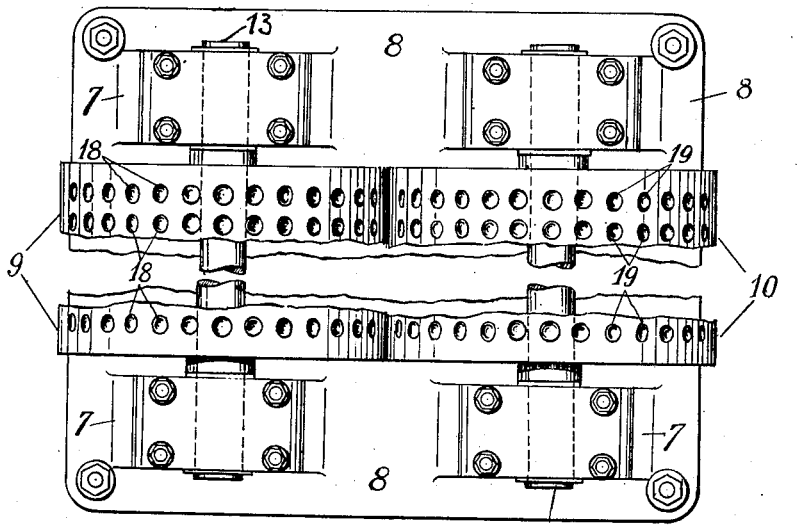
Figure 4:
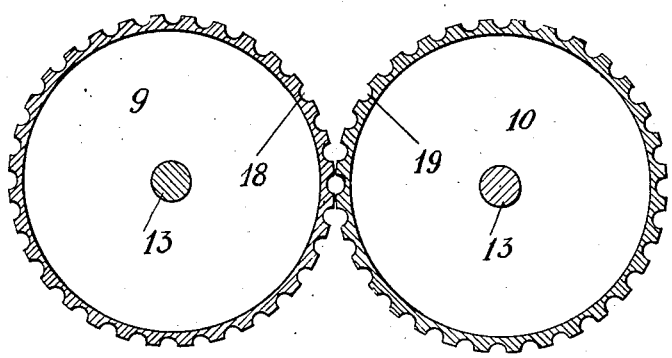

Figure 1 is a side elevation of my improved machine; Fig. 2 is a side view partly in section taken on line I—II of Fig. 1; Fig. 3 a plan view of the shaping and trimming rolls; Fig. 4 a sectional view thereof on line 4—4 indicated in Fig. 3.

My invention relates to appliances for the manufacture of balls of metal and other material adapted to be worked in molten or plastic condition, and the invention consists of the hereinafter described machine for shaping of the balls in one operation in their manufacture.

A machine constructed according to my invention comprises essentially a frame; a pair of rolls, rotatably mounted therein in a horizontal position; and provided with, or supporting semi-spherical molds in corresponding positions, so that by convergingly rotating the rolls, the molds are brought together on the line of contact of the rolls, producing a complete ball mold; suitable gears are provided for rotating the rolls convergingly to each other; a trough is set above the rolls, and means for conveying the material of which the balls are to be made, as for instance, molten metal, to the trough and means for delivering the material from the trough onto the rolls, corresponding to the speed, at which the rolls are being rotated.

As shown in the drawings, illustrating a machine constructed according to my invention for the manufacture of metallic balls as are used for ball bearings and for other purposes, the frame of the machine is composed of two standards 7, preferably connected by a base 8. The rolls 9 and 10 are supported in these standards, their trunnions 13 being pillowed in suitable bearings, which are made adjustable to permit the adjustment of the rolls 9 and 10 relatively to each other. The trough 11 is supported in the extensions 12 of the standards 7 and 8 above the rolls 9 and 10, and so as to slightly incline toward the end where the outlet 14, for the emptying of the molten metal from the trough, is located. Suitable openings, or spouts 21 are provided in both sides of the bottom of the trough 11, and they are preferably so located that the outflow of the metal from the trough will coincide with the rows of cups 18 and 19, whereby a sufficient supply of metal to fill the cups is secured and excessive overflow avoided. The receptacle from which the molten metal flows into the trough 11 is not shown in the drawing, as any of the kind usually employed for the handling, etc. of molten metal may be used for the purpose.

Semi-spherical cups are provided on each of the rolls 9 and 10, preferably in equidistant rows, and equi-distantly from each other in each row, so the cups 18 and 19 are brought in exact alinement with each other, at the line of contact of the rolls, where each pair of the cups 18 and 19, when thus brought together, produces a nearly perfect sphere.

For convergingly rotating the rolls 9 and 10, gear wheels 15 and 16 are adjustably mounted on the ends of the trunnions 13 of the rolls. The object of this is to enable the rolls 9 and 10 to be set in exact alinement relatively to each other, and so the cups 18 of the roll 9 will register with the cups 19 on the roll 10 when they are rotated. The best way to effect this adjustment, is to place finished balls in some of the cups 18, and rotate the rolls until the projecting halves of the balls fill in, into the corresponding cups 19, and then move the rolls 9 and 10 closely together. The cups 18 are arranged on roll 9 as already stated, exactly as the cups 19 on the roll 10, therefore if one row of the cups in each roll are brought in alinement with each other, all other rows register perfectly on the contact line when the rolls are rotated.

The gear wheels 15 and 16 are of the same size meshing with each other, and either of them may be driven and drive the other. The driving gear is not shown in the drawing, that not being considered necessary for the understanding of my invention, and any suitable way of driving the gear wheels 15 and 16 will answer the purpose.

The operation of the machine is practically automatic in all respects. When the trough 11 is sufficiently filled with the molten metal to prevent misformation on account of interruption in the flow of the metal, the rolls 9 and 10 are started to rotate, and the spouts 21 opened. The volume of the flow of the metal must, of course, be adjusted correspondingly to the size of the balls to be produced, and to the speed at which the rolls 9 and 10 are rotated. When that is effected, the production of these balls will proceed automatically, and without interruption, as long as a sufficient supply of metal is conveyed into the trough 11. This is virtually the main part of the operator's duty, to see to it, that an ample supply of molten metal is conveyed to the trough 11. The cast and shaped balls and also the trimming, that is, the film of metal passing through between the rolls, are dropped into the base 8, and are removed for further handling.

I claim as my invention:

1. A machine for the manufacture of balls comprising a frame, a pair of rolls rotatably mounted therein, rows of semi-spherical cups formed in the rolls, the cups of the rolls adapted to register to form spherical openings, a trough for containing molten metal supported above the rolls, a series of spouts in communication with the interior of the trough and extending from opposite sides thereof, said spouts adapted to supply molten metal to the cups at a point above the point at which the rolls engage.

2. A machine for the manufacture of balls comprising a frame, a pair of rolls rotatably mounted therein, rows of semi-spherical cups formed in the peripheries of the rolls so that the cups of one roll will register with the cups of the opposite roll to form spherical openings when the rolls are rotated, a trough for containing molten metal, a series of spouts in communication with the trough, said spouts being arranged whereby an independent spout delivers material to each row of cups, and means for continually delivering molten metal to the cups.

3. In a machine for making balls, a frame, rolls mounted to rotate in the frame, rows of cups formed in the peripheries of the rolls, said cups adapted to coöperate to form spherical openings, a trough for supplying molten metal, a plurality of spouts in communication with the trough and each spout being positioned to supply a predetermined row of cups.

4. A machine for the manufacture of balls comprising a frame, a pair of rolls rotatably mounted therein, rows of semi-spherical cups formed in the rolls, the cups of the rolls adapted to register to form spherical openings, a trough for containing molten metal, supported above the rolls, a series of spouts in communication with the interior of the trough and extending from opposite sides thereof, the spouts of one side of the trough adapted to deliver material to the cups of one roll, and the spouts on the opposite side adapted to furnish material to the other roll.

MARKS LISSBERGER.

Witnesses:
A. F. TOMLINSON,
CHARLES FRANKEL.